(12) United States Patent
Hack et al.

(10) Patent No.: US 9,734,026 B2
(45) Date of Patent: Aug. 15, 2017

(54) IN-MEMORY DATA STORE REPLICATION THROUGH REMOTE MEMORY SHARING

(71) Applicant: International Business Machines Corporation, Armonk, NY (US)

(72) Inventors: Michel H. T. Hack, Cortlandt Manor, NY (US); Xiaoqiao Meng, Millwood, NY (US); Jian Tan, Santa Clara, CA (US); Yandong Wang, Elmsford, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/446,191

(22) Filed: Mar. 1, 2017

(65) Prior Publication Data

US 2017/0177453 A1    Jun. 22, 2017

Related U.S. Application Data

(63) Continuation of application No. 14/737,389, filed on Jun. 11, 2015.

(51) Int. Cl.
| | | |
|---|---|---|
| *G06F 11/00* | (2006.01) | |
| *G06F 11/20* | (2006.01) | |
| *G06F 11/16* | (2006.01) | |
| *H04L 29/08* | (2006.01) | |

(52) U.S. Cl.
CPC ...... *G06F 11/2056* (2013.01); *G06F 11/1662* (2013.01); *H04L 67/1095* (2013.01)

(58) Field of Classification Search
CPC .......... G06F 15/17331; G06F 11/1662; G06F 11/2056; G06F 11/2082; H04L 67/1095
See application file for complete search history.

(56) References Cited

U.S. PATENT DOCUMENTS

| | | |
|---|---|---|
| 9,164,702 B1 | 10/2015 | Nesbit et al. |
| 2005/0216552 A1 | 9/2005 | Fineberg et al. |
| 2011/0307736 A1 | 12/2011 | George et al. |
| 2013/0054822 A1 | 2/2013 | Mordani et al. |

(Continued)

OTHER PUBLICATIONS

Atikoglu et al., "Workload Analysis of a Large-Scale Key-Value Store," SIGMETRICS'12, Jun. 11-15, 2012, 12 Pages, ACM, London, England, UK.

(Continued)

*Primary Examiner* — Joseph Kudirka
(74) *Attorney, Agent, or Firm* — Patricia B. Feighan

(57) ABSTRACT

A method for sharing memory of a backup server with a primary server for data replication is provided. The method may include maintaining a plurality of identical memory regions between the primary server and the backup server. The method may also include determining at least one remote memory address on the backup server for a backup key-value pair, whereby the determining is based on the maintaining of the plurality of memory regions. The method may further include inserting a plurality of data from the primary server directly in the determined at least one remote memory address on the backup server. The method may additionally include providing a mirroring status of a memory allocator on the primary server to the backup server based on the inserting of the plurality of data from the primary server.

20 Claims, 9 Drawing Sheets

(56) References Cited

U.S. PATENT DOCUMENTS

2014/0201314 A1 7/2014 Borkenhagen
2016/0366216 A1 12/2016 Hack et al.

OTHER PUBLICATIONS

Cooper et al., "Benchmarking Cloud Serving Systems with YCSB," SoCC'10, Jun. 10-11, 2010, 12 Pages, ACM, Indianapolis, Indiana, USA.

Decandia et al., "Dynamo: Amazon's Highly Available Key-value Store," SOSP'07, Oct. 14-17, 2007, p. 205-220, ACM, Stevenson, Washington, USA.

Dragojević et al., "FaRM: Fast Remote Memory," Proceedings of the 11th USENIX Symposium on Networked Systems Design and Implementation (NSDI'14), Apr. 2-4, 2014, p. 401-414, USENIX Association, Seattle, WA, USA.

Evans, "jemalloc," canonware, Last Updated Mar. 1, 2014, p. 1-2, http://www.canonware.com/jemalloc/index.html, Accessed on Jun. 17, 2015.

Fan et al., "MemC3: Compact and Concurrent MemCache with Dumber Caching and Smarter Hashing," Proceedings of the 10th USENIX Symposium on Networked Systems Design and Implementation (NSDI'13), Apr. 2013, pp. 1-14, Lombard, IL.

Feldman, "RoCE: An Ethernet-InfiniBand Love Story," HPCwire, Apr. 22, 2010, p. 1-2, Tabor Communications, Inc, http://www.hpcwire.com/2010/04/22/roce_an_ethernet-infiniband_love_story/, Accessed on Jun. 17, 2015.

Ghemawat et al., "The Google File System," SOSP'03, Oct. 19-22, 2003, 15 Pages, ACM, Bolton Landing, New York, USA.

Jose et al., "Scalable Memcached design for InfiniBand Clusters using Hybrid Transports," 12th IEEE/ACM International Symposium on Cluster, Cloud and Grid Computing, 2012, p. 236-243, IEEE Computer Society.

Liu et al., "High Performance RDMA-Based MPI Implementation over InfiniBand," International Journal of Parallel Programming, Jun. 2004, p. 167-198, vol. 32, No. 3, Plenum Publishing Corporation.

Mell et al., "The NIST Definition of Cloud Computing," National Institute of Standards and Technology, Sep. 2011, p. 1-3, Special Publication 800-145.

Michael, "High Performance Dynamic Lock-Free Hash Tables and List-Based Sets," SPAA'02, Aug. 10-13, 2002, p. 1-10, ACM, Winnipeg, Manitoba, Canada.

Mongodb, "The MongoDB 3.0 Manual," MongoDB Documentation, p. 1-27, Version 3.0.4, MongoDB, Inc., http://docs.mongodb.org/manual/, Accessed on Jun. 17, 2015.

Mordkovich, "RDMA in RAMCloud," RAMCloud Presentations, Jun. 8, 2012, 32 Pages, RAMCloud Project.

Ongaro et al., "Fast Crash Recovery in RAMCloud," SOSP'11, Oct. 23-26, 2011, p. 29-41, ACM, Cascais, Portugal.

RDMA Consortium, "Architectural Specifications for RDMA over TCP/IP," RDMA Consortium Home, 2009, p. 1, http://www.rdmaconsortium.org/, Accessed on Jun. 17, 2015.

Redis, "Introduction to Redis," Redis Topics, p. 1-2, Pivotal, http://redis.io/topics/introduction, Accessed on Jun. 17, 2015.

Schiper et al., "The Energy Efficiency of Database Replication Protocols," The 44th Annual IEEE/IFIP International Conference on Dependable Systems and Networks (DSN 2014), Jun. 23-26, 2014, 12 Pages.

Shvachko et al., "The Hadoop Distributed File System," 26th Symposium on Mass Storage Systems and Technologies (MSST'10), 2010, p. 1-10, IEEE.

Van Renesse et al., "Chain Replication for Supporting High Throughput and Availability," Proceedings of the 6th Conference on Symposium on Opearting Systems Design & Implementation (OSDI'04), 2004, 14 Pages, USENIX Association.

Wang et al., "C-Hint: An Effective and Reliable Cache Management for RDMA-Accelerated Key-Value Stores," SOCC'14, Nov. 3-5, 2014, 13 Pages, ACM, Seattle, WA, USA.

Wang et al., "Gnothi: Separating Data and Metadata for Efficient and Available Storage Replication," USENIX ATC'12, 2012, 12 Pages, USENIX Association.

Zhang et al., "Mojim: A Reliable and Highly-Available Non-Volatile Memory System," ASPLOS'15, Mar. 14-18, 2015, 16 Pages, ACM, Istanbul, Turkey.

IN-MEMORY DATA STORE REPLICATION THROUGH REMOTE MEMORY SHARING

BACKGROUND

The present invention relates generally to the field of computers, and more particularly to in-memory data store replication.

Providing reliability, availability, and sustainable high performance simultaneously is challenging for modern storage systems and an in-memory data store, such as a key-value store or a document store, has grown to be a critical component of cloud computing services. Currently, general-purpose distributed memory caching systems, such as Memcached, have been widely adopted and deployed by many leading companies to speed up dynamic database-driven websites by caching data and objects in RAM to reduce the number of times an external data source (such as a database or application program interface (API)) must be read. In order to provide high-availability, many existing solutions resort to primary-backup replication to allow backup servers to take over when primaries fail.

SUMMARY

According to one embodiment, a method for sharing memory of a backup server with a primary server for data replication is provided. The method may include maintaining a plurality of identical memory regions between the primary server and the backup server. The method may also include determining at least one remote memory address on the backup server for a backup key-value pair, whereby the determining is based on the maintaining of the plurality of memory regions. The method may further include inserting a plurality of data from the primary server directly in the determined at least one remote memory address on the backup server. The method may additionally include providing a mirroring status of a memory allocator on the primary server to the backup server based on the inserting of the plurality of data from the primary server.

According to another embodiment, a computer system for sharing memory of a backup server with a primary server for data replication is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include maintaining a plurality of identical memory regions between the primary server and the backup server. The method may also include determining at least one remote memory address on the backup server for a backup key-value pair, whereby the determining is based on the maintaining of the plurality of memory regions. The method may further include inserting a plurality of data from the primary server directly in the determined at least one remote memory address on the backup server. The method may additionally include providing a mirroring status of a memory allocator on the primary server to the backup server based on the inserting of the plurality of data from the primary server.

According to yet another embodiment, a computer program product for sharing memory of a backup server with a primary server for data replication is provided. The computer program product may include one or more computer-readable storage devices and program instructions stored on at least one of the one or more tangible storage devices, the program instructions executable by a processor. The computer program product may include program instructions to maintaining a plurality of identical memory regions between the primary server and the backup server. The computer program product may also include program instructions to determine at least one remote memory address on the backup server for a backup key-value pair, whereby the determining is based on the maintaining of the plurality of memory regions. The computer program product may further include program instructions to insert a plurality of data from the primary server directly in the determined at least one remote memory address on the backup server. The computer program product may additionally include program instructions to provide a mirroring status of a memory allocator on the primary server to the backup server based on the inserting of the plurality of data from the primary server.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
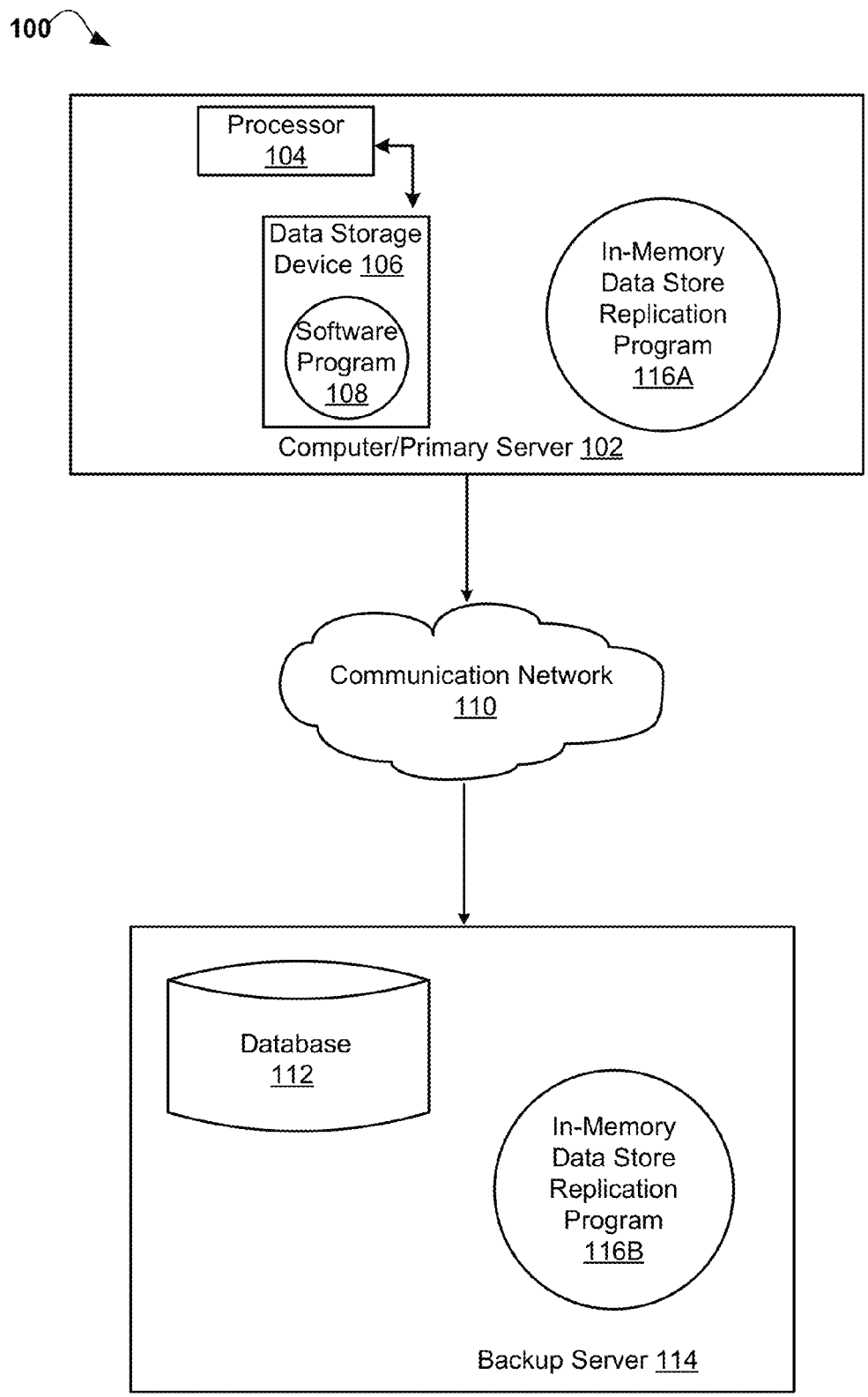
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to in-memory data store replication. The following described exemplary embodiments provide a system, method and program product to, among other things, provide in-memory data store replication through remote memory sharing. Therefore, the present embodiment has the capacity to improve the technical field of in-memory data store replication by providing a replication method for in-memory data stores through remote memory sharing that leverages remote direct memory access (RDMA) protocol. More specifically, the present embodiment may improve the replication performance and energy efficiency by providing a replication approach that shares the memory of the backup servers with the primary servers. As such, the present embodiment utilizes a remote direct memory access (RDMA) operation to contribute zero to the CPU utilization on the backup server side during normal operation paths. Therefore, the present embodiment may provide lower-latency, higher-throughput data replication, and lower energy consumption than existing solutions.

Furthermore, without such a concept as described herein, existing primary-backup replication algorithms typically need to invoke the CPU of the backup servers and require the backup servers to execute repeated computation, thus substantially increasing the latency and energy consumption. Therefore, continuing using existing replication solutions cannot fully utilize the performance advantages provisioned by high-performance network technologies.

As previously described, providing reliability, availability, and sustainable high performance simultaneously is challenging for modern storage systems and an in-memory data store, such as a key-value store or a document store, has grown to be a critical component of cloud computing services. Currently, general-purpose distributed memory caching systems have been widely adopted and deployed by many leading companies to speed up dynamic database-driven websites by caching data and objects in RAM to reduce the number of times an external data source (such as a database or application program interface (API)) must be read. However, such current solutions are at the cost of substantially increasing the latency and energy consumption and as a result, some systems try to use low-end machines so as to reduce the energy cost. As such, it may be advantageous, among other things, to provide in-memory data source replication through remote memory sharing.

According to at least one implementation, the present embodiment provides a replication protocol that uses remote memory sharing that allows remote direct memory access (RDMA) protocol to be leveraged to deliver high-performance replication with low energy cost. RDMA provides many features, including ultra-low latency (single-digit microsecond), kernel-bypass, and zero CPU utilization. As such, two main RDMA operations, RDMA Read and RDMA Write, may be utilized in accordance with various implementations of the present embodiment in order to provide in-memory data source replication through remote memory sharing.

More specifically, the present embodiment provides sharing memory of backup servers with primary servers for data replication whereby the data placement decisions and data transfer to the backup memory is managed by the primary server. As such, the present embodiment maintains identical memory regions between primary and backup servers for determining remote memory addresses for backup key-value pairs and enabling the primary server to insert data directly in the backup servers (remote memories) using remote direct memory access (RDMA) writes. Additionally, the present embodiment provides a mirroring status of the memory allocator on the primary server to the backup server so that backup server can take over when the primary server fails.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product that provides in-memory data store replication through remote memory sharing. According to the present embodiment, remote memory sharing may minimize the memory management and data transfer burden from backup shards (i.e. processes), and shift the bulk of the data placement decision making process and data transfer responsibility to the primary servers. Therefore, with the capability of determining the remote memory addresses for the backup key-value pairs and index entries, a primary server may directly insert data into the remote memory by RDMA Writes.

According to at least one implementation, the present embodiment may provide a replication system in which the memory space on the backup servers mirror the memory space on the primary servers. More particularly, the present embodiment may manage the backup data placement and transferring through: controlling the data placement on remote memory; achieving data replication by leveraging RDMA protocol; and organizing the index metadata on backup servers. Furthermore, the present embodiment may re-synchronize primary servers with newly added backup servers. Additionally, the present embodiment may allow the clients to determine the remote memory addresses on either the primary server or the backup server to retrieve the data.

Referring to FIG. 1, an exemplary networked computer environment 100 in accordance with one embodiment is depicted. The networked computer environment 100 may include a computer (i.e., computer/primary server) 102 with a processor 104 and a data storage device 106 that is enabled to run a software program 108 and an In-Memory Data Store Replication Program 116A. The networked computer environment 100 may also include a server (i.e., a backup server) 114 that is enabled to run an In-Memory Data Store Replication Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the In-Memory Data Store Replication Program 116B running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the In-Memory Data Store Replication Program 116A, 116B may interact with a database 112 that may be embedded in various storage devices, such as, but not limited to a computer/mobile device 102, a networked server 114, or a cloud storage service.

As previously described, the client computer/primary server 102 may access the In-Memory Data Store Replication Program 116B, running on server (i.e., backup server) computer 114 via the communications network 110. For example, a user using a client computer/primary server 102 may utilize the In-Memory Data Store Replication Program 116A, 116B to perform in-memory data store replication through remote memory sharing. The In-Memory Data Store Replication method is explained in more detail below with respect to FIG. 2.

Figure 2:
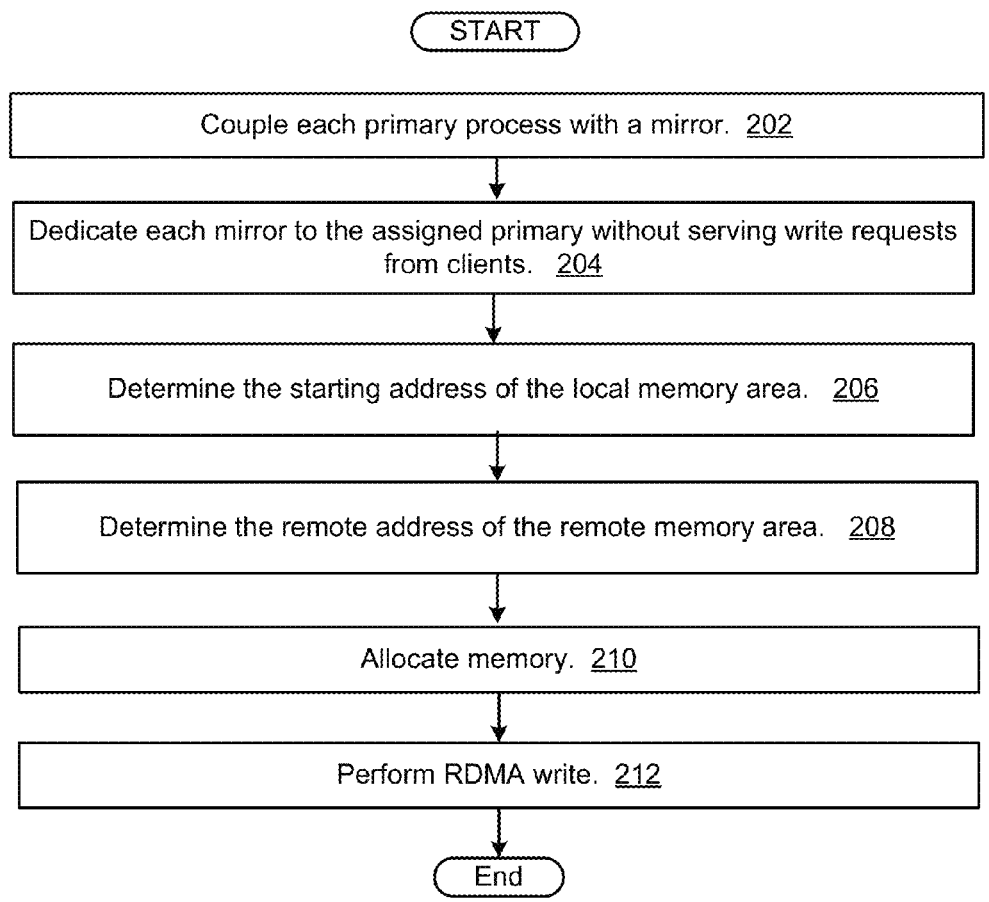
FIG. 2 is an operational flowchart illustrating the steps carried out by a program that performs in-memory data store replication through remote memory sharing according to at least one embodiment.

Referring now to FIG. 2, an operational flowchart 200 illustrating the steps carried out by a program that performs in-memory data store replication through remote memory sharing in accordance with one embodiment is depicted. As previously described, the In-Memory Data Store Replication Program 116A, 116B (FIG. 1) may provide for sharing memory of backup servers with primary servers for data replication whereby the data placement decisions and data transfer to the backup memory is managed by the primary server. More specifically, the present embodiment may maintain identical memory regions between primary and backup servers for determining remote memory addresses for backup key-value pairs and enabling the primary server to insert data directly in the backup servers (remote memories) using remote direct memory access (RDMA) writes. Additionally, the present embodiment may include mirroring the status of the memory allocator on the primary server to the backup server so that backup server can take over when the primary server fails. As such, in the event of a failover, the present embodiment may rebuild the hash table structure by reading the index region; scan the hash table to specify which memory area has been used; and copy the entire memory regions to the remote side to synchronize.

According to at least one implementation, the present embodiment may be implemented into a DRAM-based RDMA driven key-value store. At 202, during runtime, the DRAM-based RDMA driven key-value store couples each primary process (i.e., shard), with a mirror process. Then at 204, each mirror process is dedicated to the assigned primary process without serving write requests from clients. Mirror shards serve read operations by allowing clients to directly retrieve content stored in the data storage area via RDMA read and use cache-line versioning to facilitate the detection of data inconsistency on the client sides. In addition, the DRAM-based RDMA driven key-value store is equipped with a ZooKeeper cluster that is used to monitor the aliveness of all shard processes and guarantee a consistent view of the process status. ZooKeeper is an open source Apache™ project that provides a centralized infrastructure and services that enable synchronization across a cluster. ZooKeeper maintains common objects needed in large cluster environments.

According to the present embodiment, tracing code may be embedded into the memory allocator to expose the memory allocation activities. As such, the starting address of the local memory area is determined at 206 and the remote address of the remote memory area is determined at 208 so that the memory on the backup sever can be allocated at 210. As previously described, the present embodiment may maintain identical memory regions between primary and backup servers for determining remote memory addresses for backup key-value pairs and enable the primary server to insert data directly in the backup servers (remote memories) using remote direct memory access (RDMA) writes.

As such, at 212, an RDMA Write operation is performed. According to at least one implementation, tracing code may be embedded into the memory allocator to integrate three major key-value write operations. The first write operation is an Insert operation which puts a key-value into the store only when the key-value does not exist. Across the operation, the present embodiment records the modification conducted for inserting the data. As such, if the amount of changes satisfies predefined conditions (affected descriptors are contiguous and the total size is below a threshold), 3 RDMA operations are issued to replicate the index entry, key-value data, and allocation metadata, respectively.

The second write operation is an Update operation that stores data only when the data exists. As such, based on the size of input, the present embodiment uses either an in-place or out-of-place update. The in-place update reuses a previously allocated area so only 2 RDMA operations are needed to clone the index entry and key-value. In contrast, since an out-of-place update requires freeing the old memory chunk, 5 RDMA writes in total are required to accomplish a replication. To curb such write amplification, the present embodiment delegates the mirror to replay the request without using zero-copy operations.

The third write operation is a Remove operation which may only change a small number of descriptors. Thus, similar to insert operation, 3 RDMA operations are needed to clean the index entry, reformat reclaimed key-value area, and update descriptor. However, throughout the design, the present embodiment only considers the memory allocation information about the data storage area without taking account of any metadata area that is used to store all the index entries. (This is because the size of index entries are predetermined and they are pre-generated during the system initialization phase.) Therefore, by keeping the sign of whether the entry is being used or not, the mirror can efficiently rebuild the indexing data structures through scanning all the entries during failover.

An example pseudo-code of write operations in accordance with at least one implementation may be as follows:

```
1.   Check Remote Log Extended Confirmation
2.      local_addr ← Starting address of local memory area;
3.      remote_addr ← Starting address of remote memory area (obtained during initialization);
4.      local_kv ← ALLOCATE_MEMORY (local_addr, kv_size);
5.      IF ( local_kv is valid ) THEN
6.         COPY (KV, local_kv, kv_size);
7.         offset ← local_kv - local_addr;
8.         remote_kv ← remote_addr + offset;
9.         RDMA WRITE (local_kv, remote_kv, kv_size);
10.        IF ( RDMA Write succeeds ) THEN
11.           index ← <version, hash, kv_size, remote_kv>;
12.           remote_log_cur_pos ← Current position of the remote log;
13.           RDMA WRITE (index_address, remote_log_cur_pos, index_size);
14.           RDMA WRITE (allocator_meta, remote_allocator_space, meta_size);
```

```
15.         IF ( RDMA Write succeeds ) THEN
16.            remote_log_cur_pos += index_size;
17.            IF ( remote_log_cur_pos + index_size > remote_log_end ) THEN
18.               Asynchronously Invoke Log Extension;
19.            END IF
20.         ELSE
21.            Error process procedure && undo the operation on backup;
22.         END IF
23.      ELSE
24.         Error process procedure;
25.      END IF
26.  END IF
```

It may be appreciated that FIG. 2 provides only an illustration of one implementation and does not imply any limitations with regard to how different embodiments may be implemented. Many modifications to the depicted environments may be made based on design and implementation requirements. As previously mentioned, with the advance of current network technologies, existing replication algorithms can no longer fully utilize the performance advantages provisioned by high-performance networks. However, the replication method as described herein with respect to the present embodiment may deliver lower-latency and higher-throughput replication performance with lower energy consumption through remote memory sharing that can efficiently use RDMA.

The present embodiment provides a memory allocator cooperative replication (MacR) which is a lightweight replication protocol to synchronize in-memory content among mirroring nodes. By separating the metadata and data (while dynamically determining the replication strategies via considering the memory allocation information) the present embodiment may efficiently curb the latency overhead and reduce the CPU utilization on the mirror nodes. According to at least one implementation, the present embodiment decouples the metadata and data of each operation, and directly replicates them into the metadata storage area and data store within the mirror node by leveraging zero-copy networking technology. Additionally, the activities performed by the memory allocator during each write operation are exposed and as such, the present embodiment may dynamically determine the most efficient replication approach according to the exposed information.

Referring now to FIGS. 3A-3D, exemplary block diagrams 300 of a primary server and a backup server in accordance with one embodiment is depicted. With respect to FIG. 3A, an exemplary block diagram 300 of maintaining identical memory regions between primary and backup machines to exploit the RDMA performance in accordance with one embodiment is depicted. As previously described, remote memory sharing minimizes the memory management and data transfer burden from backup shards, and shifts the bulk of data placement decision making process and data transfer responsibility to the primary servers. With the capability of determining the remote memory addresses for the backup key-value pairs 308 and index entries 304, a primary server 312 can directly insert data into the remote memory by RDMA Writes. For example, with respect to FIG. 3A, maintaining identical memory regions 302-308 between primary 312 and backup 314 machines may exploit the RDMA performance. Significantly, the advantages offered by remote memory sharing as described herein with respect to the present embodiment may include low-latency and high-bandwidth data replication as well as decreased CPU utilization and energy consumption.

Figure 3A:
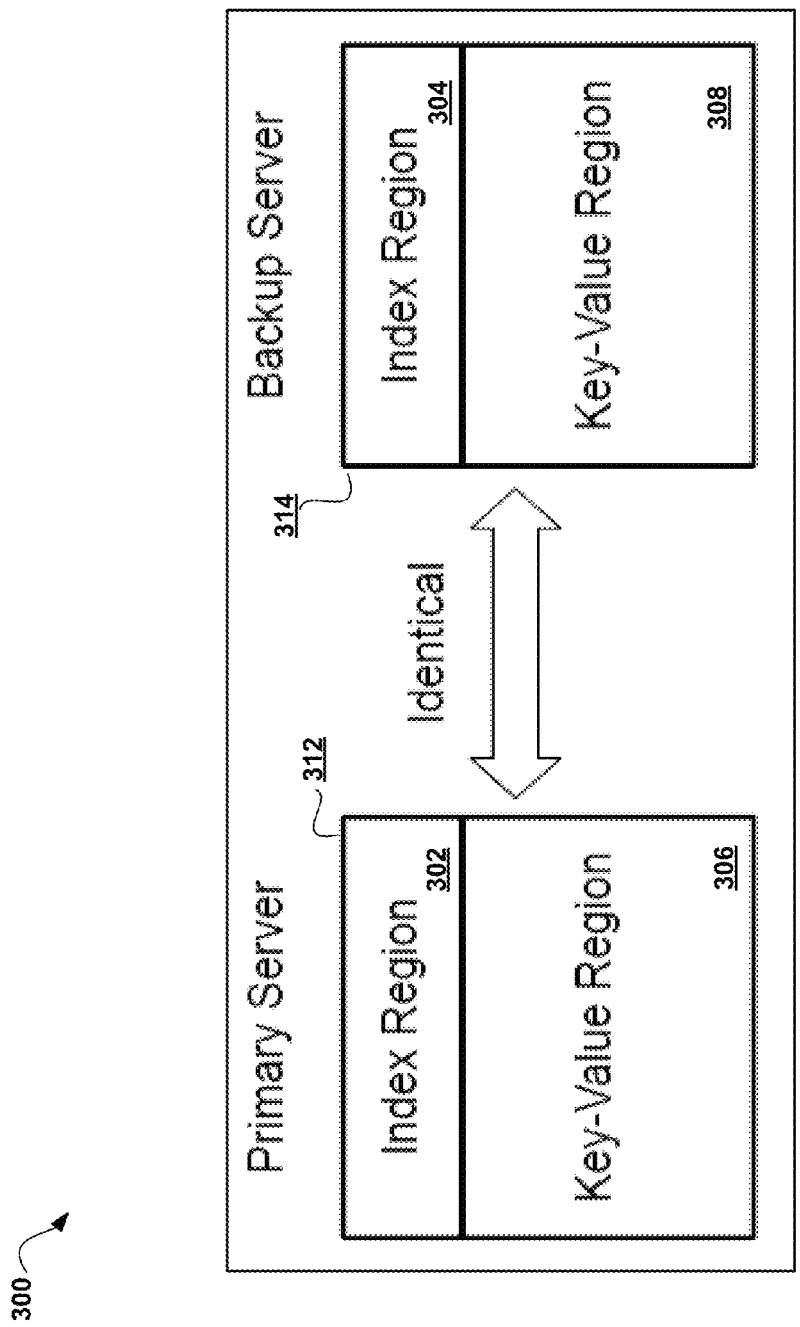
FIGS. 3A-3D are exemplary block diagrams 300 of a primary server and a backup server according to at least one embodiment.
Figure 3B:
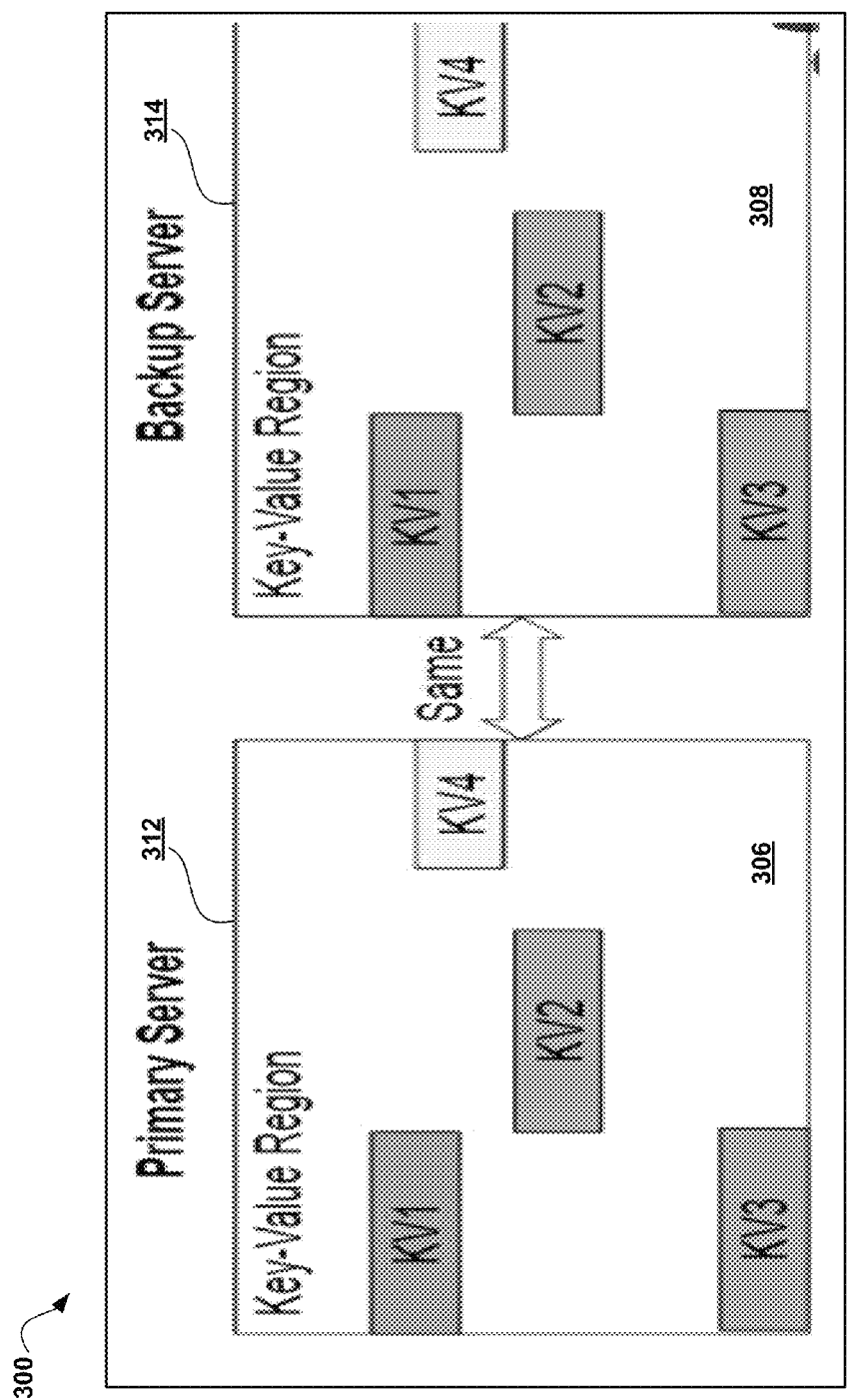

Referring now to FIG. 3B, an exemplary block diagram 300 of backup data item placement in accordance with one embodiment is depicted. According to at least one implementation, a primary process knows the starting memory address of the memory region on the backup server 314. Then, when the primary knows the local offset to which data is written, it can also compute the remote memory address on the backup server 314 to write data. Therefore, once a remote memory address is determined, the primary process can leverage RDMA Write to insert data into the remote without invoking remote side CPU. As such, the key-value region 306 of the primary server 312 and the key-value region 308 of the backup server 314 will be the same.

Figure 3C:
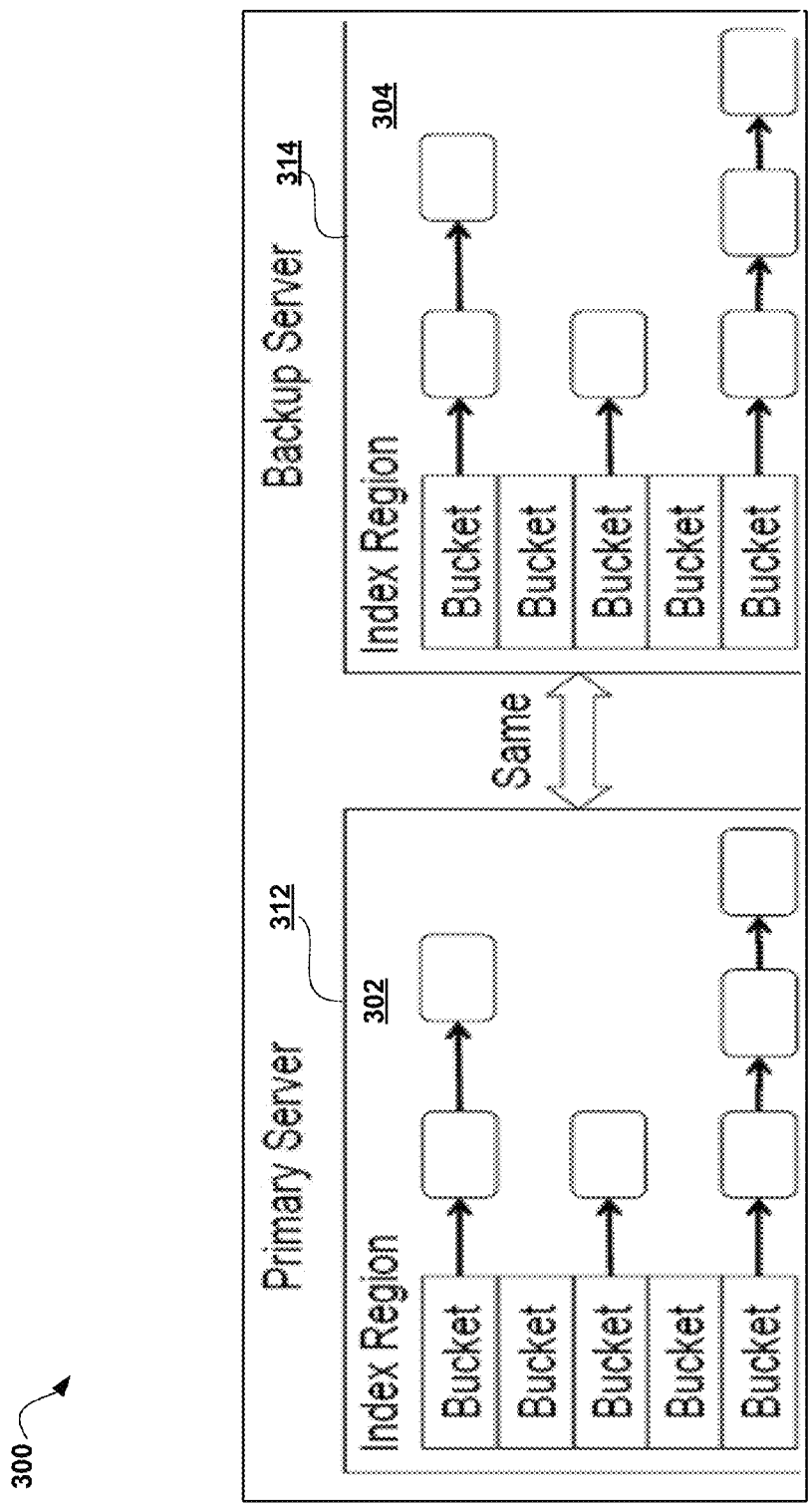

Referring now to FIG. 3C, an exemplary block diagram 300 of an in-memory backup index in accordance with one embodiment is depicted. According to at least one implementation, a primary process may use a hash table (HT) as the primary index region 302 on the primary server 312 to answer queries. While maintaining an identical HT as a backup index 304 on the backup server 314 disallows RDMA writes to be leveraged since HT entries are dynamically generated and the HT does not exhibit a linear memory topology. According to the present embodiment, when the primary server 312 fails, a backup can simply read from the index region 304 of the backup server 314 to rebuild the status of the hash table.

Figure 3D:
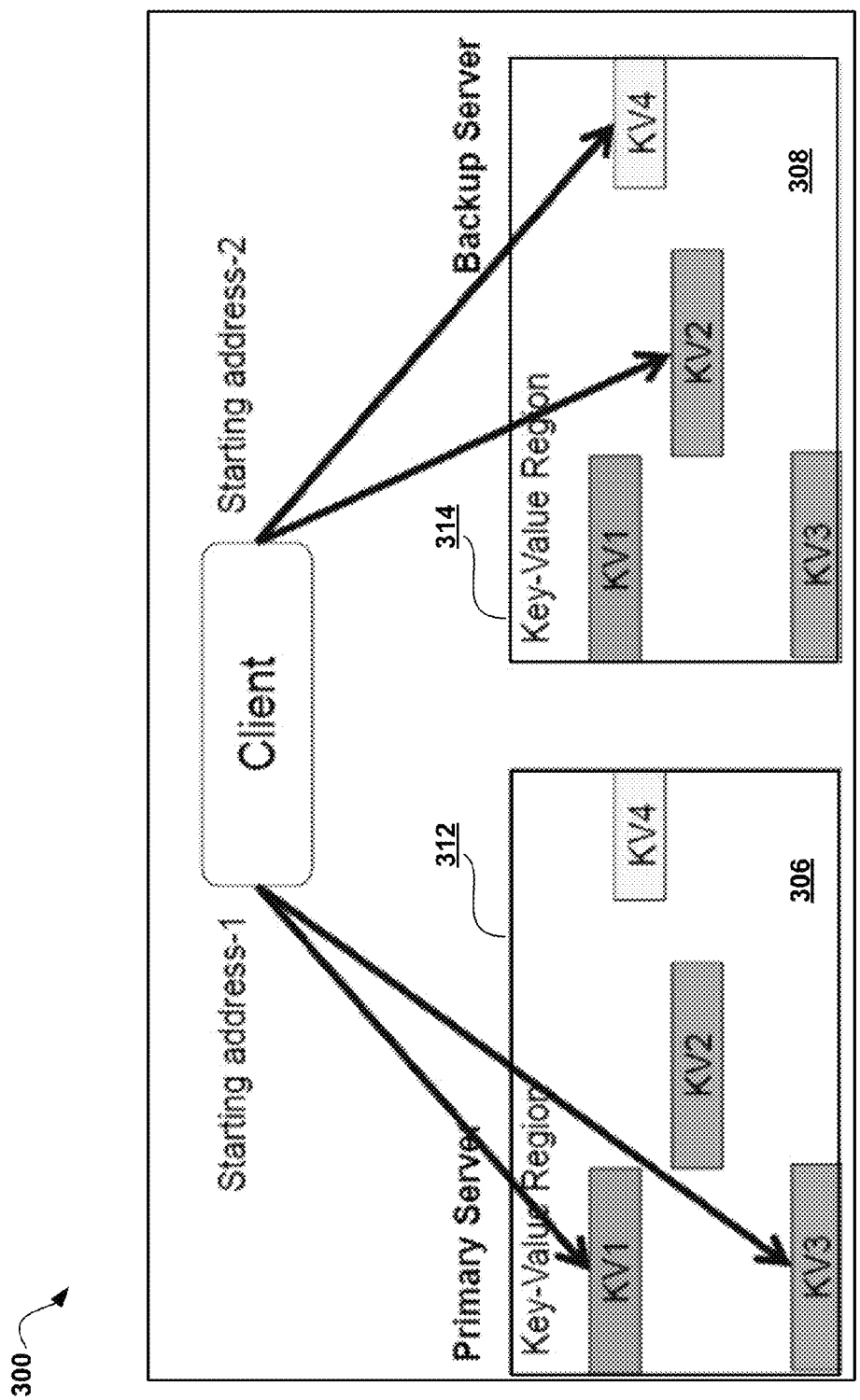

Referring now to FIG. 3D, an exemplary block diagram 300 of an enhanced load balance and throughput in accordance with one embodiment is depicted. As previously described, tracing code may be embedded into the memory allocator to expose the memory allocation activities. As such, the starting address in the key-value region 306 of the local memory area on the primary server 312 may be determined and the remote address in the key-value region 308 of the remote memory area on the backup server 314 may be determined so that memory may be allocated accordingly.

Figure 4:
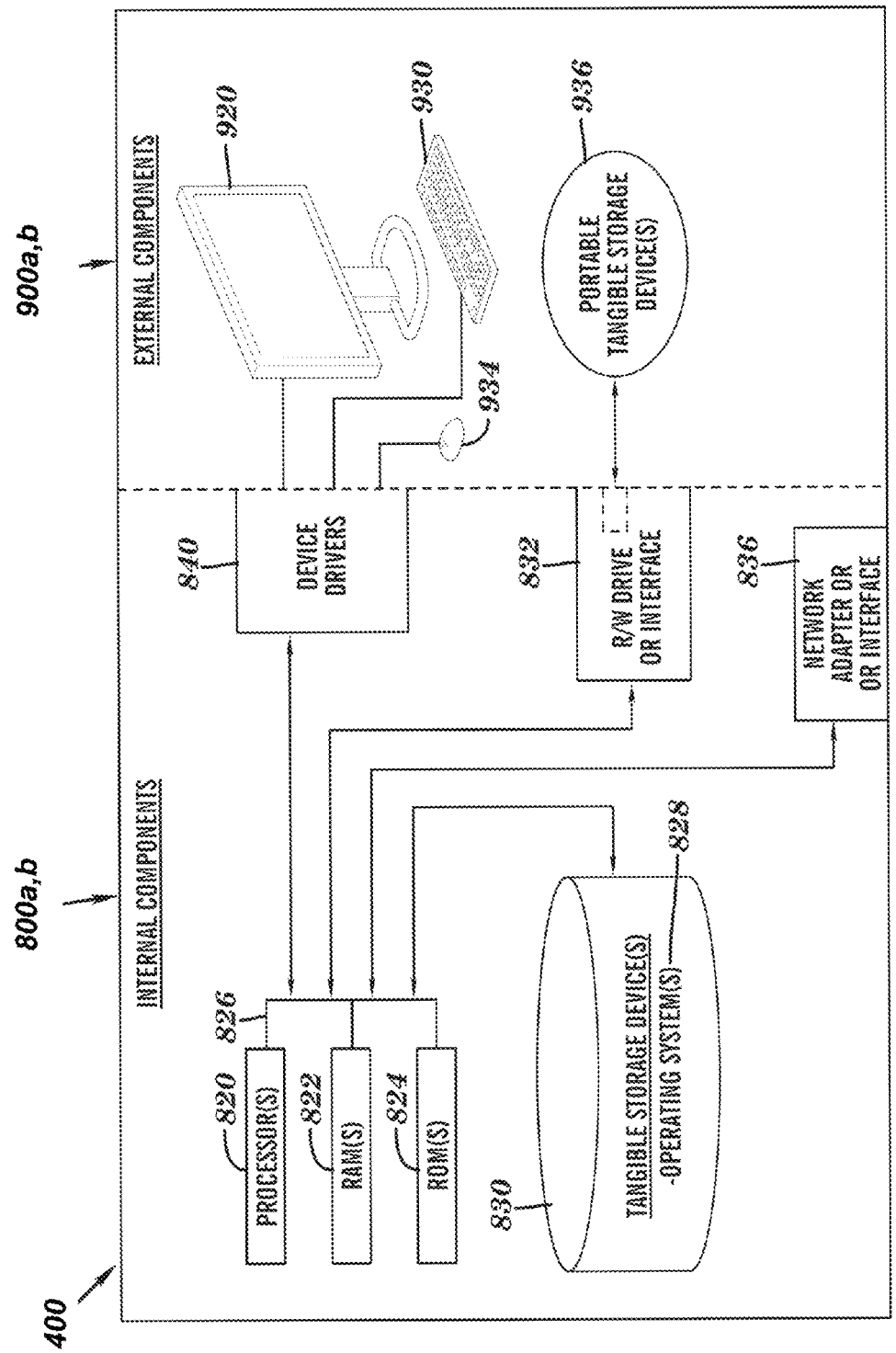
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 4. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the In-Memory Data Store Replication Program 116A (FIG. 1) in client computer 102 (FIG. 1) and the In-Memory Data Store Replication Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the In-Memory Data Store Replication Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the In-Memory Data Store Replication Program 116A (FIG. 1) in client computer 102 (FIG. 1) and the In-Memory Data Store Replication Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the In-Memory Data Store Replication Program 116A (FIG. 1) in client computer 102 (FIG. 1) and the In-Memory Data Store Replication Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
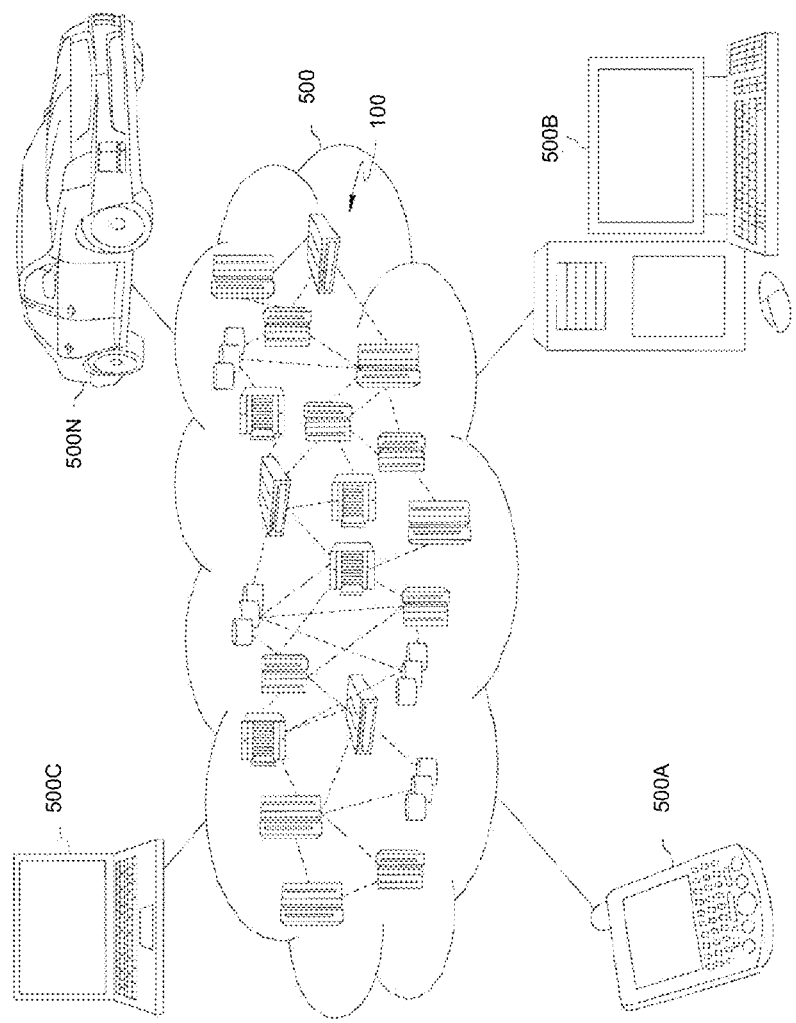
FIG. 5 is a block diagram of an illustrative cloud computing environment including the computer system depicted in FIG. 1, according to at least one embodiment.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
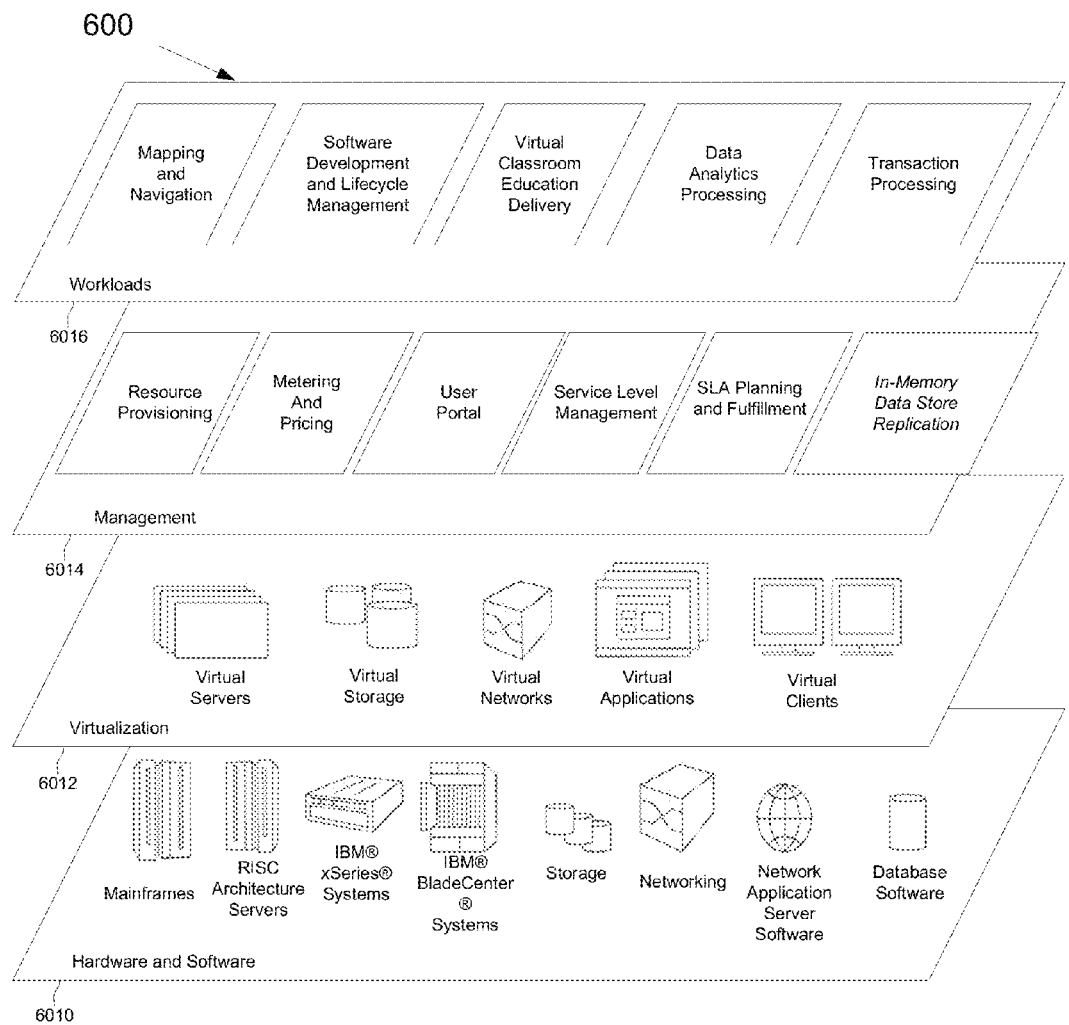
FIG. 6 is a block diagram of functional layers of the illustrative cloud computing environment of FIG. 5, according to at least one embodiment.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 6010 includes hardware and software components. Examples of hardware components include: mainframes; RISC (Reduced Instruction Set Computer) architecture based servers; storage devices; networks and networking components. In some embodiments, software components include network application server software.

Virtualization layer 6012 provides an abstraction layer from which the following examples of virtual entities may be provided: virtual servers; virtual storage; virtual networks, including virtual private networks; virtual applications and operating systems; and virtual clients.

In one example, management layer 6014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA. An In-Memory Data Store Replication Program may perform in-memory data store replication through remote memory sharing.

Workloads layer 6016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for sharing memory of a backup server with a primary server for data replication, the method comprising:

maintaining, by a processor, a plurality of identical memory regions between the primary server and the backup server;

determining at least one remote memory address on the backup server for a backup key-value pair, wherein the determining is based on the maintaining of the plurality of memory regions and embedding a plurality of tracing code into a memory allocator on the backup server;

inserting a plurality of data from the primary server directly in the determined at least one remote memory address on the backup server; and providing a mirroring status of a memory allocator on the primary server to the backup server based on the inserting of the plurality of data from the primary server.

2. The method of claim 1, further comprising:
managing a plurality of placement decisions and data transfer to a plurality of backup memory on the backup server.

3. The method of claim 2, wherein the managing of the plurality of placement decisions and data transfer is managed by the primary server.

4. The method of claim 1, wherein the inserting is performed using a plurality of remote direct memory access (RDMA) writes.

5. The method of claim 1, further comprising:
re-synchronizing the primary server with a newly added backup server.

6. The method of claim 1, further comprising:
enabling the backup server to take over when the primary server fails, wherein a hash table structure is rebuilt by reading indices.

7. The method of claim 1, further comprising:
organizing indices of metadata on the backup server.

8. The method of claim 1 further comprising:
determining a remote memory address on either the primary server or the backup server to retrieve a plurality of data, wherein the remote memory address to retrieve the plurality of data is determined by a user or determined automatically.

9. A computer system for sharing memory of a backup server with a primary server for data replication, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
maintaining, by a processor, a plurality of identical memory regions between the primary server and the backup server;
determining at least one remote memory address on the backup server for a backup key-value pair, wherein the determining is based on the maintaining of the plurality of memory regions and embedding a plurality of tracing code into a memory allocator on the backup server;
inserting a plurality of data from the primary server directly in the determined at least one remote memory address on the backup server; and
providing a mirroring status of a memory allocator on the primary server to the backup server based on the inserting of the plurality of data from the primary server.

10. The computer system of claim 9, further comprising:
managing a plurality of placement decisions and data transfer to a plurality of backup memory on the backup server.

11. The computer system of claim 10, wherein the managing of the plurality of placement decisions and data transfer is managed by the primary server.

12. The computer system of claim 9, wherein the inserting is performed using a plurality of remote direct memory access (RDMA) writes.

13. The computer system of claim 9, further comprising:
re-synchronizing the primary server with a newly added backup server.

14. The computer system of claim 9, further comprising:
enabling the backup server to take over when the primary server fails, wherein a hash table structure is rebuilt by reading indices.

15. The computer system of claim 9, further comprising:
organizing indices of metadata on the backup server.

16. The computer system of claim 9 further comprising:
determining a remote memory address on either the primary server or the backup server to retrieve a plurality of data, wherein the remote memory address to retrieve the plurality of data is determined by a user or determined automatically.

17. A computer program product for sharing memory of a backup server with a primary server for data replication, the computer program product comprising:
one or more computer-readable storage devices and program instructions stored on at least one or more tangible storage devices, the program instructions executable by a processor, the program instructions comprising:
program instructions to maintain a plurality of identical memory regions between the primary server and the backup server;
program instructions to determine at least one remote memory address on the backup server for a backup key-value pair, wherein the determining is based on the maintaining of the plurality of memory regions and embedding a plurality of tracing code into a memory allocator on the backup server;
program instructions to insert a plurality of data from the primary server directly in the determined at least one remote memory address on the backup server; and
program instructions to provide a mirroring status of a memory allocator on the primary server to the backup server based on the inserting of the plurality of data from the primary server.

18. The computer program product of claim 17, further comprising:
program instructions to manage a plurality of placement decisions and data transfer to a plurality of backup memory on the backup server.

19. The computer program product of claim 18, wherein the managing of the plurality of placement decisions and data transfer is managed by the primary server.

20. The computer program product of claim 17, wherein the inserting is performed using a plurality of remote direct memory access (RDMA) writes.

* * * * *